United States Patent [19]
Yoshikawa et al.

[11] Patent Number: 6,100,332
[45] Date of Patent: Aug. 8, 2000

[54] COATING COMPOSITION FOR ELECTRIFYING MEMBERS AND ELECTROPHOTOGRAPHIC CARRIER

[75] Inventors: Yuji Yoshikawa; Masaaki Yamaya, both of Gunma-ken, Japan

[73] Assignee: Shin-Etsu Chemical Co., Ltd., Tokyo, Japan

[21] Appl. No.: 09/233,464

[22] Filed: Jan. 20, 1999

[30] Foreign Application Priority Data

Jan. 20, 1998 [JP] Japan ................................. 10-22647

[51] Int. Cl.⁷ ........................................................ G08F 8/02
[52] U.S. Cl. ...................... 525/101; 430/106.6; 430/108; 430/112; 430/113; 430/116; 524/837; 524/859; 525/100; 525/479; 528/12; 528/24; 528/25; 528/26
[58] Field of Search .................................. 525/101, 100, 525/479; 524/837, 859; 528/12, 24, 25, 26; 430/106.6, 108, 112, 113, 116

[56] References Cited

U.S. PATENT DOCUMENTS

| | | |
|---|---|---|
| 5,066,698 | 11/1991 | Hazan et al. . |
| 5,077,354 | 12/1991 | Woo et al. ................................. 528/26 |
| 5,366,768 | 11/1994 | Kasari et al. . |
| 5,652,079 | 7/1997 | Mochizuki et al. . |
| 5,684,066 | 11/1997 | Eklund et al. . |
| 5,731,120 | 3/1998 | Tanigami et al. . |
| 5,780,530 | 7/1998 | Mizutani et al. . |

FOREIGN PATENT DOCUMENTS

| | | |
|---|---|---|
| 0555879 | 8/1993 | European Pat. Off. . |
| 0588560 | 3/1994 | European Pat. Off. . |
| 0702068 | 3/1996 | European Pat. Off. . |
| 0774499 | 5/1997 | European Pat. Off. . |
| 0781811 | 7/1997 | European Pat. Off. . |
| 0843226 | 5/1998 | European Pat. Off. . |
| 2023505 | 8/1970 | France . |
| 2390481 | 12/1978 | France . |
| 0115230 | 8/1984 | France . |
| 55-127569 | 10/1980 | Japan . |
| 55-157751 | 12/1980 | Japan . |
| 56-140358 | 11/1981 | Japan . |
| 59-8827 | 2/1984 | Japan . |
| 59-228261 | 12/1984 | Japan . |
| 61-140951 | 6/1986 | Japan . |
| 62-23308 | 5/1987 | Japan . |
| 62-61948 | 12/1987 | Japan . |
| 1-147478 | 6/1989 | Japan . |
| 2-23181 | 1/1990 | Japan . |
| 6-1392 | 1/1994 | Japan . |
| 7-104522 | 4/1995 | Japan . |

OTHER PUBLICATIONS

Patent Abstracts of Japan, vol. 004, No. 184 (P–041), Dec. 18, 1980 (JP 55 127569 A).

JP–A 58–184951 (Abstract) Oct. 28, 1983. (See corresponding reference above).

JP–A 58–117554 (Abstract) Jul. 13, 1983. (See corresponding reference above).

JP–A 60–76754 (Abstract) May 1, 1985. (See corresponding reference above).

JP–A 61–204643 (Abstract) Sep. 10, 1986. (See corresponding reference above).

*Primary Examiner*—Robert Dawson
*Assistant Examiner*—Jeffrey B. Robertson
*Attorney, Agent, or Firm*—Birch, Stewart, Kolasch & Birch, LLP

[57] ABSTRACT

A coating composition comprising a mixture of a methyl-rich silicone resin (S-1) and an acrylic resin (A-1) obtained by polymerizing at least one radical polymerizable vinyl monomer (M-1), or a reaction product obtained by reacting the silicone resin (S-1) with the radical polymerizable vinyl monomer (M-1) is suitable for coating carrier particles to form an electrophotographic carrier.

9 Claims, No Drawings

COATING COMPOSITION FOR ELECTRIFYING MEMBERS AND ELECTROPHOTOGRAPHIC CARRIER

This invention relates to a coating composition for electrifying members and an electrophotographic carrier sing the same.

BACKGROUND OF THE INVENTION

In electrophotography and electrostatic printing process, carriers, sleeves, and doctor blades are electrifying members having a function of imparting triboelectric charges to a toner for electrostatic development. The electrifying member is generally coated with a suitable agent for controlling its electric charging.

A typical two-component developer for dry copiers consists of fine toner particles and larger carrier particles. The toner and the carrier are electrostatically charged to opposite polarity by mixing and agitating them in frictional contact. The thus charged toner is electrostatically attached to an electrostatic latent image formed on a photoconductor drum to form a visible image, which is transferred and fixed to a transfer sheet to accomplish duplication. As the carrier, oxidized or unoxidized iron powder is commonly used. When iron powder carrier as such is mixed with the toner to form a developer, the carrier has insufficient triboelectric charging characteristics to the toner, and the toner gradually adheres to the carrier surface to form a toner film (known as toner-spent phenomenon), which raises the problem that the charging characteristics of the carrier change with time and eventually the developer has a shorter life. Another problem is a considerable difference in the charging characteristics of the carrier between dry and humid states.

To overcome these drawbacks, the carrier is often coated on the surface with suitable resins such as acrylic resins, styrene-acryl copolymers, silicone, polyester, and fluoro-resins. Of these, silicone resins and fluoro-resins draw an attention in that they can alleviate the toner-spent phenomenon on account of their low surface energy. In particular, silicone resins can be dissolved in a variety of solvents and prepared to a variety of molecular structures through a choice of monomers. This leads to the advantage that carriers having a wide range of charge quantity level can be formed by a choice of the silicone resin, a third component, and working conditions. For example, it was proposed to control the charging quantity of the carrier by curing a room temperature, moisture curable silicone resin at elevated temperature (JP-B 61948/1987) or by using a silicone resin loaded with a tin compound (JP-B 3181/1990 and 1392/1994). These methods are successful in providing a large charge quantity to the positive chargeable toner, but fail to provide a sufficient charge quantity to the negative chargeable toner.

A number of methods were proposed to solve the above problems. For example, JP-A 127569/1980, 147478/1989, 140951/1986, and 104522/1995 disclose nitrogenous silicone resins and aminosilane-containing silicone resins. JP-A 157751/1980, JP-B 8827/1984, JP-B 23308/1987, JP-A 140358/1981, and JP-A 228261/1985 disclose silicone resins reacted or mixed with organic resins, especially acrylic resins. These resins, however, fail to provide a constant charge quantity and are less durable.

Particularly, since the mixture or reaction product of a silicone resin and an acrylic resin requires compatibility between the resins, the typical silicone resin used is a phenyl-rich silicone resin having good compatibility with organic resins, which is likely to give rise to the toner-spent phenomenon.

SUMMARY OF THE INVENTION

Therefore, an object of the invention is to provide a coating composition for electrifying members, which provides a high charge quantity level to the negative chargeable toner and stable charging characteristics enough to avoid the toner-spent phenomenon.

Another object of the invention is to provide an electrophotographic carrier comprising carrier core particles coated with the coating composition.

We have found that better results are obtained from a methyl-rich silicone resin, specifically a silicone resin in which methyl comprises at least 70 mol % of all the organic groups directly attached to silicon atoms. More particularly, a mixture or reaction product obtained by mixing or reacting a methyl-rich silicone resin with an acrylic resin in a specific ratio is superior in low-temperature curing, dryness, hardness, and flexibility to conventional well-known silicone resins, acrylic resins, phenyl-rich silicone acrylic resins. When this resin is used as a coating composition for electrifying or charge-providing members, especially electrophotographic carriers, the composition offers advantages including no blocking because of superior dryness, a greater charge quantity, no charge-up, and consistent charging characteristics. Other advantages are flexibility, durability and firm adhesion.

According to the invention, there is provided a coating composition for electrifying members comprising as a main component a mixture of (1) a silicone resin (S-1) represented by the following average compositional formula (1):

$$(CH_3)_m R^1_n SiX^1_p O_{(4-m-n-p)/2} \quad (1)$$

wherein $R^1$ is a substituted or unsubstituted monovalent hydrocarbon group having at least two carbon atoms, $X^1$ is a hydroxyl or hydrolyzable group, letters m, n and p are numbers satisfying: $0.5 \leq m \leq 1.8$, $0 \leq n \leq 0.54$, $0.5 \leq m+n \leq 1.8$, $0.7 \leq m/(m+n) \leq 1.0$, $0 < p \leq 1.5$, and $0.5 < m+n+p \leq 2.5$, and (2) an acrylic resin (A-1) obtained by polymerizing at least one radical polymerizable vinyl monomer (M-1), in a weight ratio (S-1)/(A-1) of from 1/10 to 10/1. A coating composition comprising a reaction product obtained by reacting (1) the silicone resin (S-1) with (2') the radical polymerizable vinyl monomer (M-1) in a weight ratio (S-1)/(M-1) of from 1/10 to 10/1 is also contemplated as well as a coating composition comprising both the mixture and the reaction product.

Preferably, the main component is obtained by polymerizing at least one radical polymerizable vinyl monomer (M-1) in the presence of the silicone resin (S-1) and a polymerization initiator.

The preferred silicone resin is a silicone resin (S-2) represented by the following average compositional formula (1'):

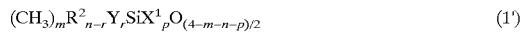

$$(CH_3)_m R^2_{n-r} Y_r SiX^1_p O_{(4-m-n-p)/2} \quad (1')$$

wherein Y is a vinyl-polymerizable organic group, $R^2$ is a substituted or unsubstituted monovalent hydrocarbon group having at least two carbon atoms exclusive of Y, letter r is $0.001 \leq r \leq 0.2$, and $X^1$, m, n, and p are as defined above. Specifically, the silicone resin (S-2) of formula (1') corresponds to the silicone resin (S-1) of formula (1) wherein the substituent Y is introduced as part of $R^1$.

Accordingly, in one preferred embodiment, the invention provides a coating composition comprising as the main component a resin obtained by copolymerizing (1) a silicone resin (S-2) represented by formula (1') with (2) at least one radical polymerizable vinyl monomer (M-1), in a weight ratio (S-2)/(M-1) of from 1/10 to 10/1.

The radical polymerizable monomer used herein is preferably a combination of a vinyl-polymerizable hydrolyzable silane compound (M-2) represented by the general formula (2):

$$Y(CH_3)_q SiX^2_{3-q} \qquad (2)$$

wherein Y is a vinyl-polymerizable organic group, $X^2$ is a hydrolyzable group, and letter q is 0, 1 or 2, with a radical polymerizable vinyl monomer (M-1') other than the silane compound (M-2). In this preferred embodiment, the components are preferably reacted while setting the weight ratio (S-1)/(M-1') between 1/10 and 10/1 and the weight ratio (M-2)/(M-1') between 1/1000 and 1/5.

The coating composition of this preferred embodiment comprises as the main component a resin obtained by copolymerizing a vinyl-polymerizable hydrolyzable silane compound (M-2) represented by formula (2) with a radical polymerizable vinyl monomer (M-1') other than the silane compound (M-2) in the presence of a silicone resin (S-1) represented by formula (1) in a weight ratio (S-1)/(M-1') of from 1/10 to 10/1 and (M-2)/(M-1') of from 1/1000 to 1/5.

DETAILED DESCRIPTION OF THE INVENTION

The silicone resin used herein is a silicone resin (S-1) of the following average compositional formula (1), specifically a silicone resin (S-2) of the following average compositional formula (1'), wherein methyl accounts for at least 70 mol %, preferably at least 80 mol %, more preferably at least 90 mol % of all the organic substituent groups ($CH_3$, $R^1$, $R^2$, and Y) directly attached to silicon atoms.

$$(CH_3)_m R^1_n SiX^1_p O_{(4-m-n-p)/2} \qquad (1)$$

$$(CH_3)_m R^2_{n-r} Y_r SiX^1_p O_{(4-m-n-p)/2} \qquad (1')$$

In the formulas, $R^1$ and $R^2$ represent substituted or unsubstituted monovalent hydrocarbon groups having at least two carbon atoms. The unsubstituted monovalent hydrocarbon groups are preferably those of 2 to 10 carbon atoms, for example, alkyl groups such as ethyl, propyl, isopropyl, butyl, t-butyl, hexyl, cyclohexyl, octyl, and decyl, alkenyl groups such as vinyl, allyl, 5-hexenyl, and 9-decenyl, and aryl groups such as phenyl.

The substituted monovalent hydrocarbon groups are unsubstituted monovalent hydrocarbon groups of at least two carbon atoms, preferably 2 to 10 carbon atoms, wherein some or all of the hydrogen atoms are replaced by substituents. Examples of such substituents include (i) halogen atoms such as fluorine and chlorine, (ii) epoxy functional groups such as glycidyloxy and epoxycyclohexyl, (iii) (meth)acryl functional groups such as methacryl and acryl, (iv) amino functional groups such as amino, aminoethylamino, phenylamino and dibutylamino, (v) sulfurous functional groups such as mercapto and tetrasulfide, (vi) alkyl ether functional groups such as (polyoxyalkylene) alkyl ether, (vii) anionic groups such as carboxyl and sulfonyl, and (viii) groups containing a quaternary ammonium salt structure. Illustrative examples of the substituted mono-valent hydrocarbon groups include trifluoropropyl, perfluorobutylethyl, perfluorooctylethyl, 3-chloropropyl, 2-(chloromethylphenyl)ethyl, 3-glycidyloxypropyl, 2-(3,4-epoxycyclohexyl)ethyl, 5,6-epoxyhexyl, 9,10-epoxydecyl, 3-(meth)acryloxypropyl, 11-(meth)acryloxyundecyl, 3-aminopropyl, N-(2-aminoethyl)aminopropyl, 3-(N-phenylamino)propyl, 3-dibutylaminopropyl, 3-mercaptopropyl, 2-(4-mercaptomethylphenyl)ethyl, polyoxyethylenoxypropyl, 3-hydroxycarbonylpropyl, and 3-tributylammoniumpropyl. When it is desired to improve adhesion, epoxy, amino and mercapto functional groups may be applied. When it is desired to provide tight blocking with the vinyl polymer, (meth)acryl functional groups capable of radical copolymerization or mercapto functional groups having the function of a chain transfer agent may be applied. When it is desired to provide crosslinking with the vinyl polymer through bonds other than siloxane bonds, there may be introduced functional groups capable of reaction with the organic functional groups in the vinyl polymer, for example, epoxy groups (for reaction with hydroxy, amino or carboxyl groups) and amino groups (for reaction with epoxy or acid anhydride groups).

The silicone resin (S-2) in which vinyl-polymerizable groups are introduced in order to react with the vinyl polymer or enhance that reaction is represented by the above formula (1'). In formula (1'), Y is exemplified by 3-methacryloxypropyl, 3-acryloxypropyl, 3-methacryloxyundecyl, 3-acryloxyundecyl, vinyl, hexenyl, 4-vinylphenyl, 3-(4-vinylphenyl)propyl, 4-vinylphenylmethyl, and styryl. Also in formula (1'), $R^2$ is selected from the same groups as $R^1$ except for Y, preferably those groups free of an aliphatic unsaturated bond.

In formulas (1) and (1'), $X^1$ is a hydroxyl (OH) or hydrolyzable group. Examples of the hydrolyzable group include halogen atoms such as chlorine, alkoxy, acyloxy, alkenoxy, phenoxy, and iminoxy groups. Illustrative are methoxy, ethoxy, propoxy, isopropoxy, butoxy, sec-butoxy, t-butoxy, isopropenoxy, phenoxy, acetoxy, and butanoxime. Methoxy, ethoxy and isopropoxy are especially preferred.

In formula (1), letters m, n and p are numbers satisfying:

$0.5 \leq m \leq 1.8$, especially $0.8 \leq m \leq 1.5$, $0 \leq n \leq 0.54$, especially $0 \leq n \leq 0.3$, $0.5 \leq m+n \leq 1.8$, especially $0.8 \leq m+n \leq 1.5$, $0.7 \leq m/(m+n) \leq 1.0$, especially $0.8 \leq m/(m+n) \leq 1.0$, $0 < p \leq 1.5$, especially $0.2 \leq p \leq 1.0$, and $0.5 < m+n+p \leq 2.5$, especially $0.8 \leq m+n+p \leq 2.4$.

In formula (1'), letter r is a number satisfying $0.001 \leq r \leq 0.2$.

The reason of limitation of these letters is given below. With m less than 0.5, a cured coating becomes too hard and likely to crack. With m more than 1.8, a cured coating becomes rubbery and less mar resistant because of an increased number of chain units. Preferably, m ranges from 0.8 to 1.5. Values of n in excess of 0.54 mean increased contents of groups other than methyl, which tend to incur a toner-spent phenomenon and are difficult to maintain hardness. The reason of limitation of m+n is the same as described for m. While silanol and/or hydrolyzable groups are essential, values of p in excess of 1.5 cause the silicone resin to become unstable and reduced in molecule, resulting in a brittle coating. For storage stability and good curability, p is preferably in the range of 0.05 to 1.2, especially 0.2 to 1.0.

As long as the above requirements are met, the silicone resin which can be used herein may be prepared by any method. One preferred illustrative method for making is described below.

The starting material from which the silicone resin is prepared may be any of silane compounds having 1, 2, 3 or 4 hydrolyzable groups and organic substituents satisfying the above-mentioned requirements. Examples of the silane compound which can be used herein include vinyltrichlorosilane, vinyltrimethoxysilane, vinyltriethoxysilane, vinylmethyldichlorosilane, vinylmethyldimethoxysilane, vinylmethyldiethoxysilane, 5-hexenyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-(meth)acryloxypropyltrimethoxysilane, 3-(meth)acryloxypropyltriethoxysilane, 3-(meth)acryloxypropylmethyldimethoxysilane, 3-(meth)acrlyoxypropylmethyldiethoxysilane, 4-vinylphenyltrimethoxysilane, 3-(4-vinylphenyl)propyltrimethoxysilane, 4-vinylphenylmethyltrimethoxysilane, 3-aminopropyltrimethoxysilane, 3-aminopropyltriethoxysilane, 3-aminopropylmethyldimethoxysilane, 3-aminopropylmethyldiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane, and 3-mercaptopropylmethyldiethoxysilane, which are known as silane coupling agents. Also included are tetrachlorosilane, tetramethoxysilane, tetraethoxysilane, tetrabutoxysilane, methyltrichlorosilane, methyltrimethoxysilane, methyltriethoxysilane, methyltriisopropoxysilane, methyltributoxysilane, methyltriisopropenoxysilane, dimethyldichlorosilane, dimethyldimethoxysilane, dimethyldiethoxysilane, dimethyldiisopropoxysilane, dimethyldibutoxysilane, dimethyldiisopropenoxysilane, trimethylchlorosilane, trimethylmethoxysilane, trimethylethoxysilane, trimethylisopropenoxysilane, ethyltrichlorosilane, ethyltrimethoxysilane, propyltrichlorosilane, butyltrichlorosilane, butyltrimethoxysilane, hexyltrichlorosilane, hexyltrimethoxysilane, decyltrichlorosilane, decyltrimethoxysilane, phenyltrichlorosilane, phenyltrimethoxysilane, cyclohexyltrichlorosilane, cyclohexyltrimethoxysilane, propylmethyldichlorosilane, propylmethyldimethoxysilane, hexylmethyldichlorosilane, hexylmethyldimethoxysilane, phenylmethyldichlorosilane, phenylmethyldimethoxysilane, diphenyldichlorosilane, diphenyldimethoxysilane, dimethylphenylchlorosilane, and partial hydrolyzates thereof. For the ease of operation and ease of distillation of by-products, it is preferred to use methoxysilanes and ethoxysilanes. The organic silicon compounds which can be used herein are not limited to these examples. These silane compounds may be used alone or in admixture of two or more.

The following two ways are employable in hydrolyzing the hydrolyzable silane compound to produce the silicone resin which can be used in the invention.

A first method is by hydrolyzing the hydrolyzable silane compound in an organic solvent which is selected from among aromatic hydrocarbons such as toluene and xylene, hydrocarbons such as hexane and octane, ketone compounds such as methyl ethyl ketone and methyl isobutyl ketone, ester compounds such as ethyl acetate and isobutyl acetate, and alcohols such as methanol, ethanol, isopropanol, butanol, isobutanol, and t-butanol.

A second method is by hydrolyzing the hydrolyzable silane compound other than chlorosilanes in water. In particular, the alkoxysilane or an oligomer thereof is hydrolyzed in water in an amount of at least 2 mol per mol of the alkoxy groups. To remove the organic solvent and allow a silicone resin to grow, the hydrolysis is followed by heating for distilling off the organic solvent along with water under atmospheric pressure or vacuum. This yields a silicone resin containing much silanol groups.

This silicone resin may be added to a radical polymerizable vinyl monomer to form a solution. Upon hydrolysis, a hydrolytic catalyst may be used. Any of prior art well-known hydrolytic catalysts is employable although those hydrolytic catalysts which exhibit an acidity of pH 2 to 7 in aqueous solution are preferred. Especially preferred are acidic hydrogen halides, carboxylic acid, sulfonic acid, acidic or weakly acidic inorganic salts, and solid acids such as ion exchange resins. Examples are hydrogen fluoride, hydrochloric acid, nitric acid, sulfuric acid, acetic acid, organic carboxylic acids as typified by maleic acid, methylsulfonic acid, and cation exchange resins having sulfonate or carboxylate groups on their surface. The amount of the hydrolytic catalyst used is preferably in the range of 0.001 to 10 mol % per mol of the hydrolyzable groups on silicon atoms.

Especially preferred silicone resins (S-1) and (S-2) are those containing 35 to 65 mol % of units (T-2 units) represented by the general formula (3):

$$R—Si(OSi\equiv)_2X^1 \qquad (3)$$

wherein R is a substituted or unsubstituted monovalent hydrocarbon group having 1 to 10 carbon atoms, OSi≡ represents a residue capable of bonding through a siloxane bond, and $X^1$ is as defined above.

If the T-2 units are less than 35 mol %, the silicone resin contains a greater proportion of T-3 units represented by R—Si(OSi≡)$_3$ which would adversely affect curability, and has a greater molecular weight which would adversely affect reactivity and compatibility with acrylic resins. Silicone resins containing more than 65 mol % of T-2 units are difficult to prepare industrially.

In formula (3), exemplary groups represented by R are the same as described for $R^1$, although R may include methyl.

An appropriate molecular weight of the silicone resin is 1,000 to 10,000, especially 1,000 to 5,000 in number average molecular weight.

A second component is a radical polymerizable vinyl monomer (M-1). There may be used any of prior art well-known vinyl monomers capable of radical polymerization. Included are (a) alkyl (meth)acrylates in which alkyl groups have 1 to 18 carbon atoms, such as methyl, ethyl, propyl, isopropyl, butyl, isobutyl, octyl, 2-ethylhexyl, lauryl, stearyl and cyclohexyl esters of acrylic acid and methacrylic acid; (b) vinyl monomers containing a carboxyl group or anhydride thereof such as acrylic acid, methacrylic acid, maleic anhydride; (c) vinyl monomers containing a hydroxyl group such as 2-hydroxyethyl (meth)acrylate and 2-hydroxypropyl (meth)acrylate; (d) vinyl monomers containing an amide group such as (meth)acrylamide, N-methylol (meth)acrylamide, N-methoxymethyl (meth)acrylamide, N-butoxymethyl (meth)acrylamide, and diacetone (meth)acrylamide; (e) vinyl monomers containing an amino group such as dimethylaminoethyl (meth)acrylate and diethylaminoethyl (meth)acrylate; (f) vinyl monomers containing an alkoxy group such as methoxyethyl (meth)acrylate and butoxyethyl (meth)acrylate, (g) vinyl monomers containing a glycidyl group such as glycidyl (meth)acrylate and glycidyl allyl ether; (h) vinyl ester monomers such as vinyl acetate and vinyl propionate, (i) aromatic vinyl monomers such as styrene, vinyltoluene, and α-methylstyrene; (j) vinyl cyanide monomers such as (meth)acrylonitrile; (k) vinyl halide monomers such as vinyl chloride and vinyl bromide; (l) vinyl monomers containing at least two radical polymerizable unsaturated groups in a molecule such as divinyl benzene, allyl (meth)acrylate, ethylene glycol di(meth) acrylate, diethylene glycol di(meth)acrylate, and trimethylolpropane tri(meth)acrylate; (m) vinyl monomers containing a (poly)oxyethylene chain such as (poly)oxyethylene mono(meth)acrylates having 1 to 100 ethylene oxide groups; (n) diorganopolysiloxanes of 1 to 200 siloxane units having a radical polymerizable functional group at one end such as dimethylpolysiloxane containing a (meth)acryloxypropyl group at one end and dimethylpolysiloxane containing a styryl or α-methylstyryl group at one end; and (o) silane compounds containing a radical polymerizable functional group such as vinyltrimethoxysilane, vinyltriethoxysilane, vinylmethyldimethoxysilane, vinylmethyldiethoxysilane, 5-hexenyltrimethoxysilane, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-vinylphenyltrimethoxysilane, 3-(4-vinylphenyl)propyltrimethoxysilane, 4-vinylphenylmethyltrimethoxysilane, and styryltrimethoxysilane. These compounds may be used alone or in admixture of two or more.

Of the above-described compounds, the radical polymerizable vinyl monomer preferably contains at least one of the alkyl (meth)acrylates in which alkyl groups have 1 to 18 carbon atoms, typically in an amount of 1 to 100 mol %. An alkyl (meth)acrylate content of less than 1 mol % would be insufficient to impart chemical resistance and other desirable properties. More preferably, the radical polymerizable vinyl monomer contains 30 to 99 mol % of at least one alkyl (meth)acrylate.

When it is desired to impart solvent resistance or chemical resistance to a cured coating, a radical polymerizable vinyl monomer containing a crosslinkable functional group is preferably copolymerized. Inter alia, the silane compounds of class (o) having a radical polymerizable functional group are preferred because they can form a siloxane linkage through condensation reaction. Also the glycidyl group-containing vinyl monomers of class (g) such as glycidyl (meth)acrylate and glycidyl allyl ether are preferred because they have an epoxy functional group which is crosslinkable through ring-opening reaction between carboxylic acid and epoxy group. Silane compounds (M-2) are more appropriate in the system of the invention because the other component is a silicone resin having silanol groups.

The silane compounds (M-2) which can be used herein are preferably represented by the following general formula (2):

$$Y(CH_3)_q SiX^2_{3-q} \qquad (2)$$

wherein Y is as defined above, $X^2$ is a hydrolyzable group as described above, and letter q is 0, 1 or 2.

When it is desired to adjust a charge quantity and improve environmental properties, a diorganopolysiloxane of class (n) containing a radical polymerizable functional group at one end is preferably copolymerized. A charge quantity can also be adjusted by copolymerizing a vinyl monomer containing a nitrogen atom such as (meth)acrylate esters containing a nitrogen atom.

According to the present invention, the coating composition contains as a main component, (I) a mixture of silicone resin (S-1) and acrylic resin (A-1) obtained by polymerizing vinyl monomer (M-1), in a weight ratio (S-1)/(A-1) of from 1/10 to 10/1, especially from 1/5 to 5/1, or a reaction product obtained by polymerizing silicone resin (S-1) with vinyl monomer (M-1) in a weight ratio (S-1)/(M-1) of from 1/10 to 10/1, especially from 1/5 to 5/1, preferably a reaction product obtained by polymerizing vinyl monomer (M-1) in the presence of silicone resin (S-1) and a polymerization initiator, preferably (II) an acrylic silicone resin obtained by copolymerizing silicone resin (S-2) with vinyl monomer (M-1) in a weight ratio (S-2)/(M-1) of from 1/10 to 10/1, especially from 1/5 to 5/2, or (III) a resin obtained by copolymerizing silane compound (M-2) with vinyl monomer (M-1') other than silane compound (M-2) in the presence of silicone resin (S-1), in a weight ratio (S-1)/(M-1') of from 1/10 to 10/1, especially from 1/5 to 5/1, and (M-2)/(M-1') of from 1/1000 to 1/5, especially from 1/200 to 1/7.

More particularly, when the resin (III) is obtained by copolymerizing silane compound (M-2) with vinyl monomer (M-1') in a weight ratio (M-2)/(M-1') of from 1/1000 to 1/5, a lower proportion of (M-2) below the range would lead to insufficient solvent resistance and chemical resistance whereas a higher proportion of (M-2) above the range would adversely affect stability or cause over-crosslinking so that the coating might crack.

Per 100 parts by weight of the silicone resin as the first component, the radical polymerizable vinyl monomer (M-1) or (M-1') is preferably used in an amount of 10 to 1,000 parts by weight. Less than 10 parts of (M-1) or (M-1') would provide less film forming ability and less chemical resistance whereas weather resistance and water resistance would become poor with more than 1,000 parts of (M-1) or (M-1'). More preferably, the radical polymerizable vinyl monomer (M-1) or (M-1') is used in an amount of 30 to 500 parts by weight.

The main or effective component of the coating composition according to the invention is prepared by polymerizing or copolymerizing at least one radical polymerizable vinyl monomer in the presence of the silicone resin and the polymerization initiator. The preferred preparation method is by starting with a system which originally contains no silicone resin or a minor amount of silicone resin and gradually feeding a silicone resin and an acrylic monomer to the system as reaction proceeds. This method yields a clear reaction solution even when the silicone resin remains unreacted with the acrylic monomer.

With respect to the above-described polymerization reaction, the manner of reaction is not critical and any of bulk polymerization, suspension polymerization, emulsion polymerization and solution polymerization may be employed. For the stability and ease of operation for polymerization, solution polymerization using alcohols, esters, ketones, and aromatic hydrocarbons (typically xylene) as the solvent or emulsion polymerization in aqueous media are preferably employed. If necessary, the effective component is in the form of a solution of the effective component diluted with an organic solvent or an aqueous solution or emulsion of the effective component dispersed in water.

The polymerization initiator used herein may be properly selected from water-soluble and oil-soluble ones depending on the way of polymerization or the polymerization medium. Illustrative polymerization initiators are water-soluble initiators, for example, persulfates such as potassium persulfate; hydrogen peroxide or redox initiators of hydrogen peroxide combined with reducing agents such as sodium hydrogen sulfite and sodium thiosulfate; inorganic initiators in which a minor amount of iron, ferrous salts or silver nitrate is co-present with the redox initiators; dibasic acid peroxides such as disuccinic acid peroxide and monosuccinic acid peroxide; and organic initiators such as azobisisobutylamidine dibasic acid salts. Also included are oil-soluble initiators, for example, peroxyester type peroxides such as t-butylperoxyisobutyrate and t-butylperoxyacetate and diisopropyl peroxydicarbonate, benzoyl peroxide, azobisisobutyronitrile, and dimethyl-2,2-azobis(2-methylpropionate).

The amount of the polymerization initiator used may be determined as appropriate in accordance with the type of polymerization initiator and copolymerizing conditions. Usually the initiator is used in an amount of 0.005 to 10%, especially 0.05 to 8% by weight based on the total weight of the monomers to be copolymerized.

Examples of the solvent used in solution polymerization include hydrocarbon solvents such as toluene, xylene, n-hexane, cyclohexane, and octane; alkyl alcohols such as methanol, ethanol, isopropyl alcohol, n-butyl alcohol, isobutyl alcohol, and s-butyl alcohol; ethers such as ethylene glycol monoethyl ether, ethylene glycol mono-n-butyl ether, and ethylene glycol monoethyl ether acetate; acetates such as ethyl acetate and butyl acetate; and ketones such as methyl ethyl ketone, ethyl acetoacetate, acetylacetone, methyl isobutyl ketone, acetone, and cyclohexanone.

In solution polymerization, a chain transfer agent may be used for adjusting the molecular weight of polymers or copolymers. Exemplary of the chain transfer agent are n-dodecylmercaptan, t-dodecylmercaptan, n-butylmercaptan, γ-mercaptopropyltrimethoxysilane, γ-mercaptopropyltriethoxysilane, γ-mercaptopropylmethyldimethoxysilane, and γ-mercaptopropylmethyldiethoxysilane.

When polymers or copolymers are prepared by solution polymerization, their molecular weight is not critical. An appropriate number average molecular weight is in the range of about 1,000 to about 100,000, especially about 2,000 to about 50,000 from the standpoints of ease of application and stability of the coating composition and appearance of coatings obtained therefrom.

Also preferred is an emulsion solution resulting from emulsion polymerization. The emulsion of the methyl-rich silicone resin/acrylic resin has the following advantages which are not available with prior art methods.

(i) In emulsion particles, both the resins form an interpenetrating network structure so that the shortcomings of both the resins are compensated for. This ensures formation of uniform cured coatings having improved film forming ability and excellent properties such as mar resistance, weather resistance and chemical resistance.

(ii) In emulsion particles, both the polymers are intertwined in a solventless state so that the degree of freedom of silanol groups having high condensation activity is restricted. As a result, condensation of silanol groups is suppressed even in high silanol content systems, which exhibit good storage stability. Since the silicone resin which is insoluble in water is completely incorporated in particles, the system is maintained at a satisfactory level of stability.

(iii) Inversely, as a result of the confinement of silanol groups within particles, their high curing activity is kept intact and the system exhibits good curability even at relative low temperatures.

(iv) Because of the substantial absence of solvent, the system dries and cures into a coating of quality without volatilization of harmful solvents. A safe working environment is ensured.

In some cases, a minor amount of organic solvent is contained, if necessary for improving leveling. Even in such cases, the amount of organic solvent is preferably limited to 0 to 5% by weight of the entire composition.

A surfactant is often used in emulsion polymerization. There may be used any of prior art well-known nonionic, cationic and anionic surfactants and reactive emulsifiers having radical polymerizable functional groups. Examples include nonionic surfactants such as polyoxyethylene alkyl ethers, polyoxyethylene alkyl phenyl ethers, polyoxyethylene carboxylates, sorbitan fatty acid esters, and polyoxyethylene sorbitan fatty acid esters; cationic surfactants such as alkyltrimethylammonium chloride and alkylbenzylammonium chloride; anionic surfactants such as alkyl or alkylallyl sulfates, alkyl or alkylallyl sulfonates, and dialkyl sulfosuccinates; ampholytic surfactants such as amino acid and betain type surfactants; and various reactive surfactants having a hydrophilic group such as sulfonic acid salt, polyoxyethylene chain and quaternary ammonium salt, including radical polymerizable derivatives of (meth) acrylates, styrene, and maleates as described in JP-A 27347/1996.

The surfactants may be used alone or in admixture of two or more. Preferably the surfactant is used in an amount of 0.5 to 15% by weight, especially 1 to 10% by weight based on the solid components (effective components) combined.

A radical polymerization initiator may be used upon emulsion polymerization. Examples of the radical polymerization initiator include persulfates such as potassium persulfate and ammonium persulfate; water-soluble initiators such as aqueous hydrogen peroxide, t-butylhydroperoxide, t-butylperoxymaleic acid, succinic acid peroxide, and 2,2'-azobis(2-N-benzylamidino)propane hydrochloride; oil-soluble initiators such as benzoyl peroxide, cumene hydroperoxide, dibutyl peroxide, diisopropyl peroxydicarbonate, cumyl peroxyneodecanoate, cumyl peroxyoctoate, and azoisobutyronitrile; and redox systems combined with a reducing agent such as acidic sodium sulfite, Rongalit, and ascorbic acid. The polymerization initiator may be used in an amount of 0.1 to 10%, especially 0.5 to 5% by weight based on the radical polymerizable vinyl monomer.

The method for preparing an emulsion according to the invention is described in further detail. The following two embodiments are preferred.

In the first preferred embodiment, the method of the invention includes the first step of distilling off an organic solvent from the solution of the silanol group-bearing silicone resin which is water insoluble alone, leaving essentially only the effective component; the second step of adding the silicone resin to the radical polymerizable vinyl monomer to dissolve the silicone resin in the vinyl monomer; and the third step of emulsion polymerizing the solution of the silicone resin in the vinyl monomer in the presence of a surfactant. The first step of distilling off an organic solvent is preferably carried out at as low a temperature as possible in order to maintain the highly active silanol groups intact. Since the organic solvent is once separated, this embodiment is appropriate when a silicone resin having a relatively low silanol group content and relatively high stability is used. If desired, the organic solvent is distilled off from the silicone resin solution in the co-presence of a relatively high boiling radical polymerizable vinyl monomer, thereby substituting the radical polymerizable vinyl monomer for the solvent, which is known as the solvent exchange technique. The emulsion polymerization technique may be any of prior art well-known techniques, for example, a batchwise charging technique of emulsifying the silicone resin/vinyl monomer solution in its entirety followed by polymerization, and a monomer addition technique of polymerizing the silicone resin/vinyl monomer solution while continuously adding a solution or emulsion of radical polymerizable vinyl monomer. Also useful is a seed polymerization technique of previously polymerizing a part of the emulsified solution and continuing polymerization while adding the remainder of the emulsified emulsion. A core/shell polymerization technique of changing the monomer composition of core and shell is also applicable.

The solution containing the radical polymerizable vinyl monomer is preferably emulsified by adding the solution to an aqueous solution of a surfactant and emulsifying the mixture by means of a homomixer or high pressure homogenizer. Emulsion polymerization is generally completed within about 3 to 8 hours at a temperature of 10 to 90° C., preferably 30 to 80° C.

In the second preferred embodiment, the method of the invention includes the steps of (i) hydrolyzing a hydrolyzable silane compound in water and condensation polymerizing the hydrolyzate to form a reaction mixture containing a water-insoluble silanol group-bearing silicone resin of the average compositional formula (1); (ii) removing undesirable products resulting from hydrolysis, for example, alcohols or organic solvents and other hydrolyzed by-products, from the reaction mixture, leaving a mixture consisting essentially of the silanol group-bearing silicone resin of formula (1) and water; (iii) adding a radical polymerizable vinyl monomer to the mixture whereby the silicone resin which has been present dispersed or insoluble in an aqueous system is dissolved in the vinyl monomer, and removing an aqueous layer, thereby leaving a solution of the silicone resin in the vinyl monomer; and (iv) emulsion polymerizing the solution of the silicone resin in the vinyl monomer in the presence of a surfactant. This embodiment can retard the condensation of highly reactive silanol groups because the situation that the silicone resin is left alone during the process is avoided. This embodiment is thus suitable for a water-insoluble silicone resin having a relatively high silanol group content. The method starting from the silicone resin resulting from hydrolysis and condensation in water is advantageous because that silicone resin ensures high curability and yields a cured film having high hardness and flexibility as compared with the silicone resin of the same composition prepared in an organic solvent.

Although the emulsion composition of the invention is crosslinkable and curable at room temperature, if desired, a silanol condensation catalyst is added thereto on use in order to accelerate the curing rate or to achieve improved film characteristics. The curing catalyst for condensation may be selected from prior art well-known ones, for example, basic compounds such as lithium hydroxide, sodium hydroxide, potassium hydroxide, sodium methylate, sodium acetate, sodium formate, n-hexylamine, tributylamine, and diazabicycloundecene; metal-containing compounds such as tetraisopropyl titanate, tetrabutyl titanate, aluminum triisobutoxide, aluminum triisopropoxide, aluminum acetylacetonate, aluminum perchlorate, aluminum chloride, cobalt octylate, cobalt acetylacetonate, zinc octylate, zinc acetylacetonate, iron acetylacetonate, tin acetylacetonate, dibutytin dioctylate, dibutyltin dilaurate, and dibutyltin oxide; acidic compounds such as p-toluenesulfonic acid and trichloroacetic acid; and fluorides such as potassium fluoride, sodium fluoride, tetramethylammonium fluoride, and sodium hexafluorosilicate. The condensation catalyst may be used in an amount of 0.01 to 10 parts by weight per 100 parts by weight of the silicone resin.

The system is preferably adjusted at pH 3 to 9 in order to improve the stability of the emulsion. To this end, combinations of acidic and basic compounds serving as a buffer agent for pH adjustment may be added, for example, acetic acid combined with sodium acetate, and disodium hydrogen phosphate combined with citric acid. Below pH 3 or above pH 9, the surfactant used for emulsion polymerization would become unstable or silanol groups be likely to condense. More preferably, the system is adjusted at pH 4 to 8.

To these resins, nitrogenous compounds may be added or co-hydrolyzed or copolymerized for the purpose of adjusting charging capability.

The above-described resin is contained as the main component in the coating composition for electrifying members according to the invention. The substrate on which a coating is formed by applying the coating composition includes metals, semiconductors, plastics, resins, and rubber materials although the invention is advantageously applied to electrophotographic carriers.

Typical of the carrier core particles are iron powder and ferrite powder. An alternative choice may be made among many materials known as the carrier core particles, for example, magnetic metals such as nickel and cobalt, or oxides thereof, copper, carborundum, glass beads, and silicon dioxide.

The carrier core particles usually have a particle size of about 10 to 1,000 $\mu$m, preferably about 20 to 300 $\mu$m. In the practice of the invention, the coating composition is, directly or after dissolution in an organic solvent if necessary, applied to carrier core particles by such a technique as fluidized bed, dipping or spraying, followed by drying and curing. The resulting coating preferably has a thickness of 0.1 to 20 $\mu$m. The coating step may be repeated if necessary. For a particular purpose, the coating step may be repeated while changing the components for each layer.

Since the main component resin can cure into a film at low temperature, that is, is improved in drying, the use of the resin as a carrier coating agent avoids blocking and offers the ease of application.

No particular limitation is imposed on the toner which is used together with the carrier to construct the developer. There may be used any of the toners prepared by dispersing numerous well-known synthetic dyes in a variety of binders including natural resins and synthetic resins which may be modified.

There has been described a coating composition comprising a methyl-rich main component resin which, unlike main components in conventional paints and coating compositions, includes a silicone moiety having higher contents of monomethylsiloxane and dimethylsiloxane units and minimized contents of monopheylsiloxane and diphenylsiloxane units. For this reason, the coating composition can be cured and dried at low temperatures and coatings obtained therefrom have a high hardness and flexibility and provide a consistent charge quantity. No problems arise in the commercial production of the main component resin. When the main component resin is used as a coating composition for electrifying members, especially a coating composition for electrophotographic carriers, it offers advantages including quick drying, eliminated blocking, a high level of charge quantity relative to the negative charge toner, no charge-up, and consistent charging characteristics. The coating also has excellent environmental characteristics, flexibility, durability and adhesion.

EXAMPLE

Examples of the invention are given below by way of illustration, but not by way of limitation. All parts and percents are by weight.

Preparation Example 1

A 2-liter flask was charged with 388 g (2.85 mol) of methyltrimethoxysilane, 18 g (0.15 mol) of dimethyldimethoxysilane, and 3.5 g of a 1N acetic acid aqueous solution. At 25° C., 406 g of water was added to the contents which were thoroughly mixed for hydrolysis to take place. Hydrolysis reaction was completed by agitating below 40° C. for 5 hours.

The methanol thus formed and water were distilled off at 70° C. and a vacuum of 60 Torr until no methanol was detected in the distillate, obtaining Silicon Resin A.

To Silicone Resin A, 132 g of methyl methacrylate and 70.8 g of butyl acrylate were added for dissolving the silicone resin to form a silicone resin-containing MMA/BA solution, which was isolated from the water layer. Non-volatiles 50.2% (105° C.×3 hr.) and yield 385 g.

The silicone resin had a silanol group content of 8.0% (based on the silicone resin) and a number average molecular weight of $1.3 \times 10^3$. IR absorption spectroscopy confirmed that no methoxy groups were left. Silicone Resin A was thus identified to have the following average compositional formula.

$$(CH_3)_{1.05}Si(OH)_{0.33}O_{1.31}$$

Silicone Resin A contained 51% of T-2 units.

Preparation Example 2

To Silicone Resin A, 202.8 g of methyl isobutyl ketone was added for dissolving the silicone resin to form a silicone resin-containing MIBK solution, which was isolated from the water layer. Non-volatiles 50.9% (105° C.×3 hr.) and yield 391 g.

Preparation Example 3

A 2-liter flask was charged with 265.6 g (1.95 mol) of methyltrimethoxysilane, 208.2 g (1.05 mol) of phenyltrimethoxysilane, and 3.5 g of a 1N acetic acid aqueous solution. At 25° C., 473.8 g of water was added to the contents which were thoroughly mixed for hydrolysis to take place. Hydrolysis reaction was completed by agitating below 40° C. for 5 hours.

The methanol thus formed and water were distilled off at 70° C. and a vacuum of 60 Torr until no methanol was detected in the distillate, obtaining Silicon Resin B.

To Silicone Resin B, 173.0 g of methyl methacrylate and 93.0 g of butyl acrylate were added for dissolving the silicone resin to form a silicone resin-containing MMA/BA solution, which was isolated from the water layer. Non-volatiles 50.8% (105° C.×3 hr.) and yield 560 g.

The silicone resin had a silanol group content of 6.8% (based on the silicone resin) and a number average molecular weight of $1.5 \times 10^3$. IR absorption spectroscopy confirmed that no methoxy groups were left. Silicone Resin B was thus identified to have the following average compositional formula.

$$(CH_3)_{0.65}(C_6H_5)_{0.35}Si(OH)_{0.37}O_{1.32}$$

Silicone Resin B contained 62% of T-2 units.

Preparation Example 4

To Silicone Resin B, 266.0 g of methyl isobutyl ketone was added for dissolving the silicone resin to form a silicone resin-containing MIBK solution, which was isolated from the water layer. Non-volatiles 49.9% (105° C.×3 hr.) and yield 572 g.

Preparation Example 5

A polymerization vessel equipped with a stirrer, condenser, thermometer, and nitrogen gas inlet was charged with 300 parts of MIBK and 1.5 parts of dimethyl-2,2-azobis (2-methylpropionate). With stirring, the vessel was heated to 90° C. and its interior purged with nitrogen. A uniform mixture of 300 parts of the silicone resin-containing MMA/BA solution prepared in Preparation Example 1 and 15 parts of 3-methacryloxypropylmethyldimethoxysilane was uniformly added to the vessel over 3½ hours whereupon reaction was continued for a further 2 hours to complete polymerization. The resulting silicone/acryl solution had a solids concentration of 48.8%.

Preparation Example 6

The procedure of Preparation Example 5 was repeated except that 300 parts of the silicone resin-containing MMA/BA solution prepared in Preparation Example 1 was replaced by 300 parts of the silicone resin-containing MMA/BA solution prepared in Preparation Example 3. The resulting silicone/acryl solution had a solids concentration of 48.2%.

Preparation Example 7

A 2-liter flask was charged with 380.0 g (2.79 mol) of methyltrimethoxysilane, 18.0 g (0.15 mol) of dimethyldimethoxysilane, 13.9 g (0.06 mol) of γ-methacryloxypropylmethyldimethoxysilane, and 3.5 g of a 1N acetic acid aqueous solution. At 25° C., 412 g of water was added to the contents which were thoroughly mixed for hydrolysis to take place. Hydrolysis reaction was completed by agitating below 40° C. for 5 hours.

The methanol thus formed and water were distilled off at 70° C. and a vacuum of 60 Torr until no methanol was detected in the distillate, obtaining Silicon Resin C.

To Silicone Resin C, 136.0 g of methyl methacrylate and 73.2 g of butyl acrylate were added for dissolving the silicone resin to form a silicone resin-containing MMA/BA solution, which was isolated from the water layer. Non-volatiles 50.7% (105° C.×3 hr.) and yield 407.0 g.

The silicone resin had a silanol group content of 7.7% (based on the silicone resin) and a number average molecular weight of $1.2 \times 10^3$. IR absorption spectroscopy confirmed that no methoxy groups were left. Silicone Resin C was thus identified to have the following average compositional formula.

$$(CH_3)_{1.05}(\gamma\text{-methacryloxypropyl})_{0.02}Si(OH)_{0.33}O_{1.3}$$

A polymerization vessel equipped with a stirrer, condenser, thermometer, and nitrogen gas inlet was charged with 300 parts of MIBK and 1.5 parts of dimethyl-2,2-azobis (2-methylpropionate). With stirring, the vessel was heated to 90° C. and its interior purged with nitrogen. 300 parts of the silicone resin-containing MMA/BA solution prepared above was uniformly added to the vessel over 3½ hours whereupon reaction was continued for a further 2 hours to complete polymerization. The resulting silicone/acryl solution had a solids concentration of 49.7%.

Preparation Example 8

A polymerization vessel equipped with a stirrer, condenser, thermometer, and nitrogen gas inlet was charged with 150 parts of deionized water and 0.15 part of sodium carbonate as a pH buffer. With stirring, the vessel was heated to 60° C. and its interior purged with nitrogen. To the vessel were added 0.2 part of a 1% aqueous solution of disodium ethylenediaminetetraacette and 0.06 part of a 1% aqueous solution of ferrous sulfate.

A uniform mixture of 300 parts of the silicone resin-containing MMA/BA solution prepared in Preparation Example 1 and 3 parts of 3-methacryloxypropylmethyldimethoxysilane was added to an aqueous solution containing 6.0 parts of sodium lauryl sulfate and 12.0 parts of Noigen EA-170 (trade name, Dai-Ichi Kogyo Seiyaku K. K.) in 150 parts of ion-exchanged water. The mixture was emulsified into an emulsion by a homomixer. A portion (112 parts) of the emulsion, 0.8 part of t-butyl hydroperoxide (purity 69%) and 0.3 part of Rongalit were added to the polymerization vessel where seed polymerization was-carried out. Subsequently, while the interior of the vessel was maintained at a temperature of 60° C., the remainder of the emulsion was uniformly added over 3½ hours whereupon reaction was continued at 60° C. for a further 2 hours to complete polymerization. The resulting silicone/acryl emulsion solution had a solids concentration of 50.3% and pH 7.1.

Preparation Example 9

A polymerization vessel equipped with a stirrer, condenser, thermometer, and nitrogen gas inlet was charged with 300 parts of MIBK and 1.5 parts of dimethyl-2,2-azobis (2-methylpropionate). With stirring, the vessel was heated to 90° C. and its interior purged with nitrogen. A uniform mixture of 175.5 parts of methyl methacrylate, 94.5 parts of butyl acrylate and 30 parts of 3-methacryloxypropylmethyldimethoxysilane was uniformly added over 3½ hours whereupon reaction was continued for a further 2 hours to complete polymerization. The resulting acryl solution had a solids concentration of 49.7%.

Preparation Example 10

100 parts of the acrylic resin-containing MIBK solution prepared in Preparation Example 9 was mixed with 100 parts of the silicone resin-containing MIBK solution prepared in Preparation Example 2, but they were not compatible.

Preparation Example 11

100 parts of the acrylic resin-containing MIBK solution prepared in Preparation Example 9 was mixed with 100 parts of the silicone resin-containing MIBK solution prepared in Preparation Example 4. The resulting silicone/acryl solution had a solids concentration of 49.8%.

Preparation Example 12

A 2-liter flask was charged with 326.9 g (2.4 mol) of methyltrimethoxysilane, 119.0 g (0.6 mol) of phenyltrimethoxysilane, and 3.5 g of a 1N acetic acid aqueous solution. At 25° C., 445.9 g of water was added to the contents which were thoroughly mixed for hydrolysis to take place. Hydrolysis reaction was completed by agitating below 40° C. for 5 hours.

The methanol thus formed and water were distilled off at 70° C. and a vacuum of 60 Torr until no methanol was detected in the distillate, obtaining Silicon Resin D.

To Silicone Resin D, 38.2 g of methyl isobutyl ketone was added for dissolving the silicone resin to form a silicone resin-containing MIBK solution, which was isolated from the water layer. Non-volatiles 50.1% (105° C.×3 hr.) and yield 468 g.

The silicone resin had a silanol group content of 6.2% (based on the silicone resin) and a number average molecular weight of $1.5 \times 10^3$. IR absorption spectroscopy confirmed that no methoxy groups were left. Silicone Resin D was thus identified to have the following average compositional formula.

$(CH_3)_{0.80}(C_6H_5)_{0.20}Si(OH)_{0.30}O_{1.35}$

Silicone Resin D contained 57% of T-2 units.

Preparation Example 13

100 parts of the acrylic resin-containing MIBK solution prepared in Preparation Example 8 was mixed with 100 parts of the silicone resin-containing MIBK solution prepared in Preparation Example 12. The resulting silicone/acryl solution had a solids concentration of 49.9%.

Preparation Example 14

A 2-liter flask was charged with 388 g (2.85 mol) of methyltrimethoxysilane and 18 g (0.15 mol) of dimethyldimethoxysilane. To the flask, 286.7 g of a 0.1N hydrochloric acid aqueous solution was added dropwise for hydrolysis to take place. Hydrolysis reaction was completed by agitating below 40° C. for 5 hours.

The methanol thus formed and water were distilled off at 70° C. and a vacuum of 60 Torr until no methanol was detected in the distillate, obtaining Silicon Resin E.

To Silicone Resin E, 132 g of methyl methacrylate and 70.8 g of butyl acrylate were added for dissolving the silicone resin to form a silicone resin-containing MMA/BA solution, which was isolated from the water layer. Non-volatiles 50.4% (105° C.×3 hr.) and yield 379 g.

The silicone resin had a silanol group content of 4.2% (based on the silicone resin) and a number average molecular weight of $2.3 \times 10^3$. IR absorption spectroscopy confirmed that no methoxy groups were left. Silicone Resin E was thus identified to have the following average compositional formula.

$(CH_3)_{1.05}Si(OH)_{0.17}O_{1.39}$

Silicone Resin E contained 32% of T-2 units.

Preparation Example 15

The procedure of Preparation Example 5 was repeated except that 300 parts of the silicone resin-containing MMA/BA solution prepared in Preparation Example 1 was replaced by 300 parts of the silicone resin-containing MMA/BA solution prepared in Preparation Example 14. The resulting silicone/acryl solution had a solids concentration of 48.7%.

Examples 1–5 & Comparative Examples 1–2

The silicone resins prepared in the foregoing Preparation Examples 1-15 were diluted with MIBK to a concentration of 2% except that the silicone resin prepared in Preparation Example 8 was diluted with water. Using a fluidized bed, each solution was applied to 1 kg of ferrite having an average particle size of 100 μm as the carrier core particles at 90° C. and over a period of 30 minutes. This was followed by 30 minutes of heating at 200° C., thereby giving a carrier.

Five parts by weight of negative charging toner (black, Type F by Ricoh K.K.) was added to 95 parts by weight of the carrier. These were electrically charged by shaking (shaking amplitude, 50 mm; shaking rate, 200 cycles/min.) in a plastic bottle. The toner charge was then measured with a blowoff powder charge-measuring device manufactured by Toshiba Chemical K.K. The results are shown in Table 1.

TABLE 1

| Coating solution | | Toner charge (unit μc/g) | | | | | | |
|---|---|---|---|---|---|---|---|---|
| | | Ex. 1 PE5 | Ex. 2 PE7 | Ex. 3 PE8 | Ex. 4 PE13 | Ex. 5 PE15 | CE1 PE6 | CE2 PE10 |
| Shaking time (min.) | 15 | −28.7 | −25.6 | −28.8 | −18.6 | −19.2 | −10.9 | −8.8 |
| | 30 | −29.3 | −27.2 | −30.1 | −19.3 | −20.6 | −12.3 | −10.7 |
| | 60 | −28.8 | −26.8 | −27.8 | −19.1 | −21.1 | −12.7 | −9.7 |
| | 120 | −27.0 | −25.4 | −28.8 | −18.3 | −20.4 | −11.1 | −8.1 |
| | 240 | −27.8 | −26.6 | −28.2 | −18.1 | −19.5 | −9.8 | −7.0 |

As is evident from Table 1, the carriers obtained by applying coating compositions according to the invention which were comprised of a methyl-rich silicone/acrylic resin exhibited a high electrification ability with respect to negatively chargeable toners. By contrast, the carriers coated with phenyl-rich resins in Comparative Examples 1 and 2 did not become electrically charged.

Japanese Patent Application No. 022647/1998 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A coating composition for electrifying members comprising as a main component,
    a mixture of (1) a silicone resin (S-1) represented by the following average compositional formula (1):

$$(CH_3)_m R^1_n SiX^1_p O_{(4-m-n-p)/2} \tag{1}$$

wherein $R^1$ is a substituted or unsubstituted monovalent hydrocarbon group having at least two carbon atoms, $X^1$ is a hydroxyl or hydrolyzable group, letters m, n and p are numbers satisfying: $0.5 \leq m \leq 1.8$, $0 \leq n \leq 0.54$, $0.5 \leq m+n \leq 1.8$, $0.7 \leq m/(m+n) \leq 1.0$, $0 < p \leq 1.5$, and $0.5 < m+n+p \leq 2.5$, and (2) an acrylic resin (A-1) obtained by polymerizing at least one radical polymerizable vinyl monomer (M-1), in a weight ratio (S-1)/(A-1) of from 1/10 to 10/1, or
    a reaction product obtained by reacting (1) the silicone resin (S-1) with (2') the radical polymerizable vinyl monomer (M-1) in a weight ratio (S-1)/(M-1) of from 1/10 to 10/1, or both.

2. The coating composition of claim 1 wherein the main component is obtained by polymerizing at least one radical polymerizable vinyl monomer (M-1) in the presence of the silicone resin (S-1) and a polymerization initiator.

3. The coating composition of claim 2 comprising as the main component a resin obtained by copolymerizing (1) a silicone resin (S-2) represented by the following average compositional formula (1'):

$$(CH_3)_m R^2_{n-r} Y_r SiX^1_p O_{(4-m-n-p)/2} \tag{1'}$$

wherein Y is a vinyl-polymerizable organic group, $R^2$ is a substituted or unsubstituted monovalent hydrocarbon group having at least two carbon atoms exclusive of Y, $X^1$ is a hydroxyl or hydrolyzable group, letters m, n, p and r are numbers satisfying: $0.5 \leq m \leq 1.8$, $0 \leq n \leq 0.54$, $0.001 \leq r \leq 0.2$, $0.5 \leq m+n \leq 1.8$, $0.7 \leq m/(m+n) \leq 1.0$, $0 < p \leq 1.5$, and $0.5 < m+n+p \leq 2.5$, with (2) at least one radical polymerizable vinyl monomer (M-1), in a weight ratio (S-2)/(M-1) of from 1/10 to 10/1.

4. The coating composition of claim 2 comprising as the main component a resin obtained by copolymerizing in the presence of a silicone resin (S-1) represented by the following average compositional formula (1):

$$(CH_3)_m R^1_n SiX^1_p O_{(4-m-n-p)/2} \tag{1}$$

wherein $R^1$ is a substituted or unsubstituted monovalent hydrocarbon group having at least two carbon atoms, $X^1$ is a hydroxyl or hydrolyzable group, letters m, n and p are numbers satisfying: $0.5 \leq m \leq 1.8$, $0 \leq n \leq 0.54$, $0.5 \leq m+n \leq 1.8$, $0.7 \leq m/(m+n) \leq 1.0$, $0 < p \leq 1.5$, and $0.5 \leq m+n+p \leq 2.5$, (2) a vinyl-polymerizable hydrolyzable silane compound (M-2) represented by the general formula (2):

$$Y(CH_3)_q SiX^2_{3-q} \tag{2}$$

wherein Y is a vinyl-polymerizable organic group, $X^2$ is a hydrolyzable group, and letter q is 0, 1 or 2, with (3) a radical polymerizable vinyl monomer (M-1') other than said silane compound (M-2), in a weight ratio (S-1)/(M-1') of from 1/10 to 10/1 and (M-2)/(M-1') of from 1/1000 to 1/5.

5. The coating composition of claim 1 wherein the silicone resin contains 35 to 65 mol % of units represented by the general formula (3):

$$R—Si(OSi\equiv)_2 X^1 \tag{3}$$

wherein R is a substituted or unsubstituted monovalent hydrocarbon group having 1 to 10 carbon atoms, OSi≡ represents a residue capable of bonding through a siloxane bond, and $X^1$ is as defined above.

6. The coating composition of claim 1 wherein the silicone resin is obtained by hydrolyzing an alkoxysilane or a partial hydrolyzate thereof with an amount of water to give at least 2 mol of water per mol of alkoxy groups.

7. The coating composition of claim 1 which is in the form of a solution in an organic solvent.

8. The coating composition of claim 1 which is in the form of an aqueous solution or an emulsion dispersed in water.

9. An electrophotographic carrier comprising carrier core particles to the surface of which the coating composition of claim 1 has been applied and cured.

* * * * *